(12) United States Patent
Brunswig et al.

(10) Patent No.: US 7,801,996 B2
(45) Date of Patent: Sep. 21, 2010

(54) SYSTEMS AND METHODS FOR PROVIDING A LOCAL CLIENT PROXY

(75) Inventors: Frank Brunswig, Heidelberg (DE); Thomas Gauweiler, Speyer (DE); Martin Hartig, Speyer (DE); Stefan Rau, Dielheim (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 878 days.

(21) Appl. No.: 11/223,028

(22) Filed: Sep. 12, 2005

(65) Prior Publication Data

US 2007/0061431 A1    Mar. 15, 2007

(51) Int. Cl.
G06F 15/16 (2006.01)
G06F 3/00 (2006.01)

(52) U.S. Cl. ........................... 709/227; 719/330
(58) Field of Classification Search ......... 709/227–228, 709/201, 203, 205, 219
See application file for complete search history.

(56) References Cited

U.S. PATENT DOCUMENTS

| 6,629,128 | B1 | 9/2003 | Glass |
| 6,895,444 | B1 | 5/2005 | Weisshaar et al. |
| 7,376,959 | B2* | 5/2008 | Warshavsky et al. ........ 719/330 |
| 2002/0143641 | A1* | 10/2002 | Thomas et al. ................ 705/26 |
| 2002/0147611 | A1* | 10/2002 | Greene et al. ................. 705/1 |
| 2005/0027559 | A1* | 2/2005 | Rajan et al. .................... 705/1 |
| 2005/0204047 | A1* | 9/2005 | Mitchell et al. ............ 709/228 |
| 2006/0235973 | A1* | 10/2006 | McBride et al. ............ 709/226 |

FOREIGN PATENT DOCUMENTS

WO    WO 03/091895 A2 * 11/2003

* cited by examiner

*Primary Examiner*—Benjamin R Bruckart
*Assistant Examiner*—Noel Beharry
(74) *Attorney, Agent, or Firm*—Mintz, Levin, Cohn, Ferris, Glovsky & Popeo, P.C.

(57) ABSTRACT

Methods and systems for calling a service provider using a service manager and a local client proxy. In one exemplary embodiment, a method is provided to instantiate the service manager, the service provider, and the local client proxy. In response to the service provider, the local client proxy calls another service provider through the service manager to complete the call to the other service provider.

15 Claims, 6 Drawing Sheets

SYSTEMS AND METHODS FOR PROVIDING A LOCAL CLIENT PROXY

BACKGROUND

I. Field of the Invention

The present invention relates data processing and, more particularly, using a client proxy at a server providing services.

II. Background and Material Information

In a client-server system, a client may call a service at a server to interact with the service through any kind of communication medium, such as a network. A service is a program that makes itself available to users over a communication medium. Services typically implement standardized protocols, such as XML (Extensible Markup Language) and Simple Object Access Protocol (SOAP). Moreover, there is usually some type of web mechanism, such as Universal Description, Discovery, and Integration (UDDI) that enables a client to readily locate the service and its public Application Program Interface (API).

In an enterprise that uses services (referred to as a "services framework" or an "enterprise services framework"), a client can call a service provider though an API. Examples of service providers include a catalog service provider listing products from a catalog, a pricing service provider providing pricing information of products, and a purchasing service provider allowing the purchase of a product.

When a client calls the API of a service provider though a communication medium, the service provider and its corresponding business objects are instantiated. The term "instantiate" means, in an object-oriented programming environment, deploying, customizing, running and/or executing an application on an object of a particular class. An "object" means a bundle of variables (e.g., data) and related methods accessed by software. In object-oriented programming, an object is a concrete realization (instance) of a class that consists of data and the operations associated with that data. The phrase "business object" refers to a bundle of variables and related methods that can be used for describing a business process or task.

An enterprise services framework should allow a client to call a service provider. In addition, the called service provider should be able to recursively call itself or call another service provider. For example, the catalog service provider may call the API of a pricing service provider to determine the price of a product listed in the catalog. When a service provider calls another service provider, the calling service provider should retrieve from the called service provider information reflecting the most current state of the called service provider. Thus, when a call is made to the service provider that has pending actions, such as a write, the provider should perform the pending actions before the calling service provider is allowed to interact with called service provider and the corresponding business objects. Otherwise, the calling service provider might access information that is not current.

SUMMARY

The present invention provides methods and apparatus, including computer program products, for a local client proxy at a server that allows a service provider to call other service providers using the local client proxy.

In one exemplary embodiment, there is provided a method for calling a service provider using a service manager and a local client proxy. The method may include instantiating, at a server, the service manager, the service provider, and the local client proxy. The method may also include providing, at the server, the local client proxy, such that, in response to the service provider, the local client proxy calls another service provider through the service manager to complete the call to the other service provider.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations in the following description do not represent all implementations consistent with the claimed invention. Instead, they are merely examples. Wherever possible, the same reference numbers throughout the drawings refer to the same or like parts.

Figure 1:
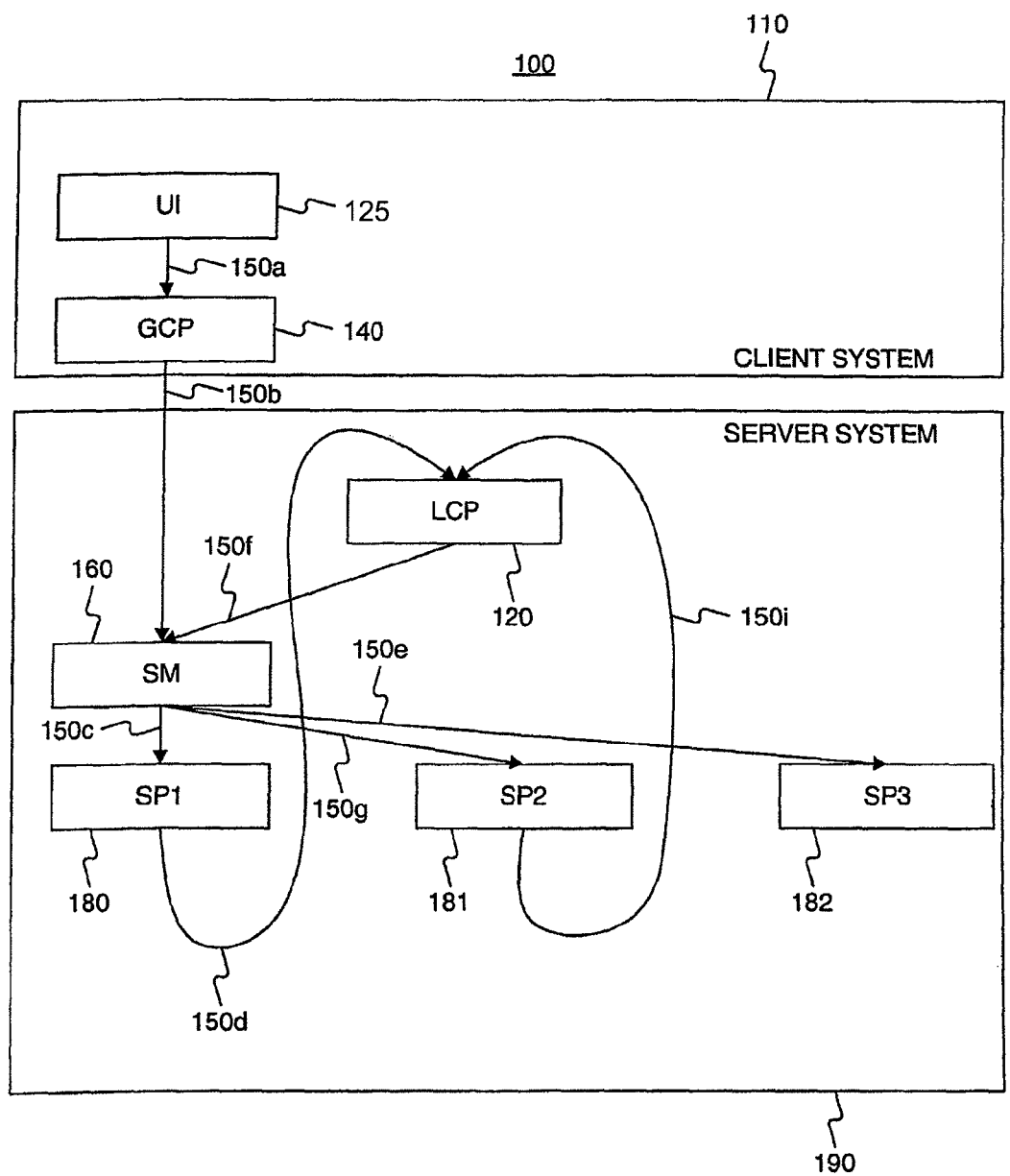
FIG. 1 illustrates a block diagram of an exemplary system environment consistent with certain aspects related to the present invention.

FIG. 1 is a block diagram of an exemplary system environment 100 that includes a client system 110 and a server system 190, with server system 190 including a local client proxy 120. Client system 110 includes a user interface (UI) 125 and a generic client proxy (GCP) 140. Client system 110 connects to server system 190 through network (or local) connection 150b. Server system 190 further includes a service manager (SM) 160, service providers (SP1-SP3) 180-182, and local client proxy 120. In some embodiments, system 100 may be implemented as part of an enterprise services framework. An enterprise services framework is a type of client-server architecture that includes one or more service providers. The service providers are accessible to the enterprise, such as client systems and their corresponding users, through a communication medium, such as the Internet or an intranet. Although FIG. 1 shows a single client system 110 and a single server system 190, a plurality of client systems and server systems may be used. Moreover, although FIG. 1 is described with respect to a client-server architecture and an enterprise services framework, system environment 100 can use any other architecture or framework.

Client 110 may include one or more processors, such as computers, to interface with server system 190. User interface 125 may provide an interface to allow a user to interact with other applications, such as service providers 180-182. User interface 125 may include a browser to provide user content from service providers 180-182. In some implementations, SAP's Web Dynpro is used as a model-based development environment for generating user interface 125, although other development environments can also be used. User interface 125 may call the API of generic client proxy 140 through network connection 150a too, for example, interact with service provider 180.

Generic client proxy 140 may have an API implemented at client 110 that is accessible to user interface 125. When instantiated, generic client proxy 140 may provide an interface, such as a Remote Procedure Call (RPC) or SOAP interface, to service manager 160 at server system 190 through network or local connection 150b. Generic client proxy 140 may be implemented to control the functionality available to user interface 125 by providing a well-defined interface to service manager 160. For example, service manager 160 may include a variety of functions, but generic client proxy 140 may be allowed access only to a subset of those functions. Moreover, generic client proxy 140 may buffer requests and/or responses between user interface 125 and service manager 160.

Network connection 150a-150g may include, alone or in any suitable combination, a telephony-based network, a local area network (LAN), a wide area network (WAN), a dedicated intranet, wireless LAN, the Internet, an intranet, a wireless network, a bus, or any other any communication medium, such as a local connection (or direct link). Further, any suitable combination of wired and/or wireless components and systems may provide network connections 150a-150g. Moreover, network connections 150a-150g may be embodied using bi-directional or unidirectional communication links. Network connections 150a-150g may also implement web-based protocols, such as Transmission Control Protocol/Internet Protocol (TCP/IP), Hyper Text Transfer Protocol (HTTP), SOAP, RPC, and the like.

Server system 190 may include one or more processors, such as computers, to interface with other computers, such as client system 190. Generic client proxy 140 calls the API of service manager 160. When the API of service manager 160 is called, an instance of the service manager 160 is created at server system 190. Service Manager 160 instance may include a message handler for handling messages to and from service manager 160; a change handler for handling changes affecting service providers 180-182 (e.g., changes that occur when user interface 125 changes, such as a button click, that affect a service provider or the corresponding business objects); and a controller for controlling dynamic properties of the instance (e.g., making data associated with a business object read-only, changeable, mandatory, invisible, and the like). An example of a dynamic property is switching on and of "associations" depending on a status of the business object. Specifically, a purchase order may have an association to an object called "published purchase order." However, the association is meaningless until the purchase order is actually published. When the purchase order has the published status, the service provider may then set the relevant dynamic property for the association to indicate "published." Service manager 160 may also include a stack for storing changes associated with the change handler in a last in, first out manner.

Moreover, when the API of service manager 160 is called, service manager 160 may instantiate one or more service providers. When service provider 180 is instantiated by service manager 160, service provider 180 may also instantiate one or more corresponding business objects. For example, a user of user interface 125 may access service provider 180 to interact with a product catalog. The data and methods associated with providing the product catalog to user interface 125 corresponds to a business object.

In some implementations, service provider 180 may call other service providers. For example, service provider 180 may be a purchasing service provider 180, which requires pricing information from pricing service provider 181. When that is the case, service provider 180 may call local client proxy 120. Local client proxy 120 provides an API, which is local to server 190. As such, local client proxy 120 may be used instead of generic client proxy 140, as the top-level caller of business objects. By requiring service providers to call other service providers using local client proxy 120, all calls to a service provider are made from service manager 160. The call through service manager 160 can use the functionality of service manager 160. Moreover, local client proxy 120 may interface to service manager 160 in a similar way as generic client proxy 140 interfaces to service manager 160, thus simplifying the API implementation at service manager 160. For example, local client proxy 120 may not implement a buffer. The use of a local client proxy may thus enable service providers to call other service providers with improved reliability.

In some implementations, the instance handler at server 190 handles the same instance of local client proxy 120, service manager 160, and service provider 180.

Local client proxy 120 may also provide to service manager 160 change notification messages concerning changes to service providers and their corresponding business objects, access to metadata associated with service providers and their business objects, and/or provide exception handling when a service provider recursively calls itself.

Figure 2:
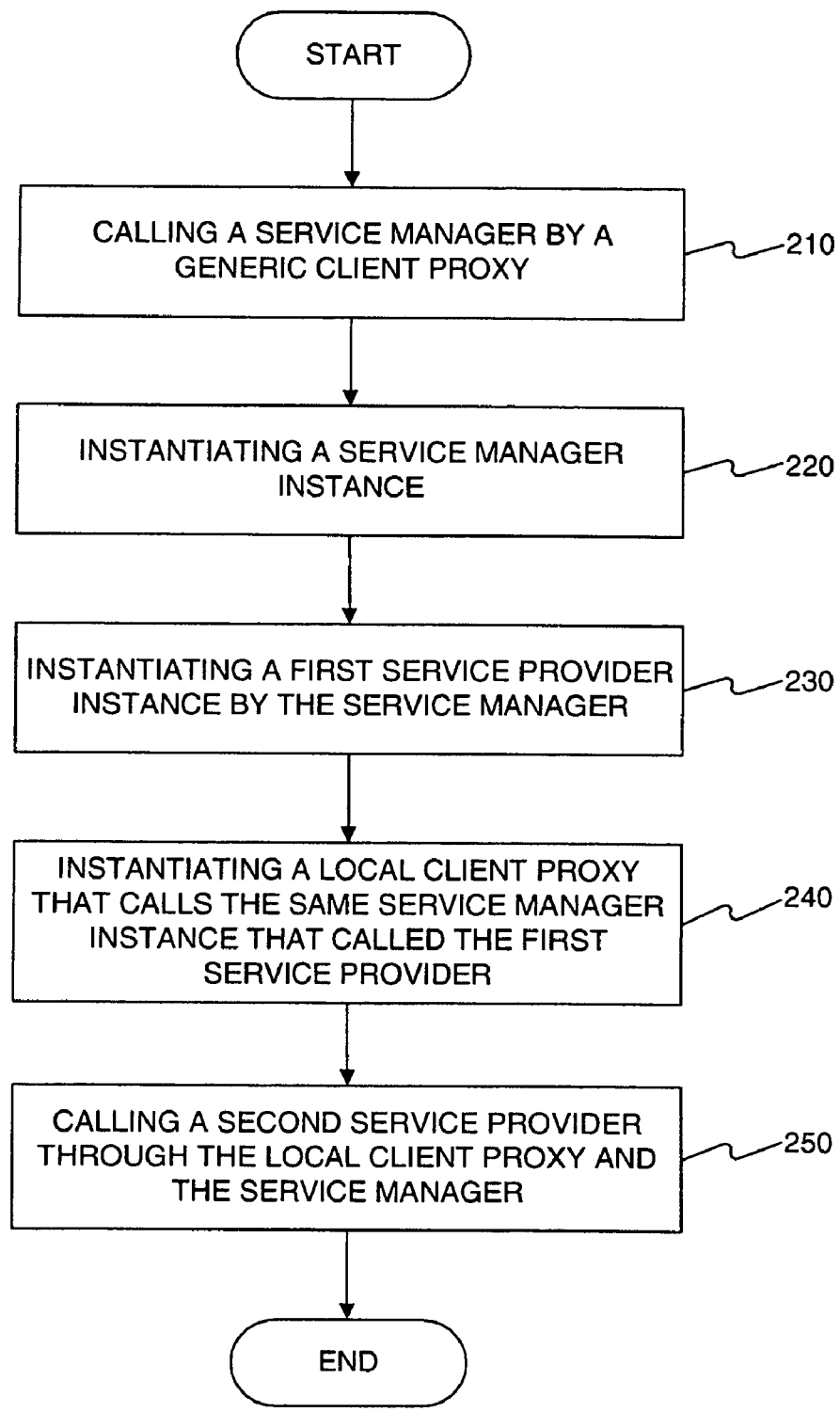
FIG. 2 illustrates a flowchart of an exemplary operation of the present invention with certain aspects related to the present invention.

FIG. 2 depicts exemplary steps for calling a service provider using local client proxy 120. Generic client proxy 140 calls the API of service manager 160 (step 210). The call to service manager 160 instantiates service manager 160 at server system 190 (step 220). Service manager 160 may then instantiate one or more service providers, such as service provider 180 (step 230). Service manager 160 may also instantiate local client proxy 120, so local client proxy 120 can call the same instance of service manager 160 that called service provider 180 (step 240). When service provider 180 wants to call itself or another service provider, such as service provider 181, service provider 180 calls through local client proxy 120. Local client proxy 120 then calls the same instance of service manager 160 that called service provider 180. Based on the call from local client proxy 120, service manager 160 then calls the API of service provider 181 (step 250).

Figure 3:
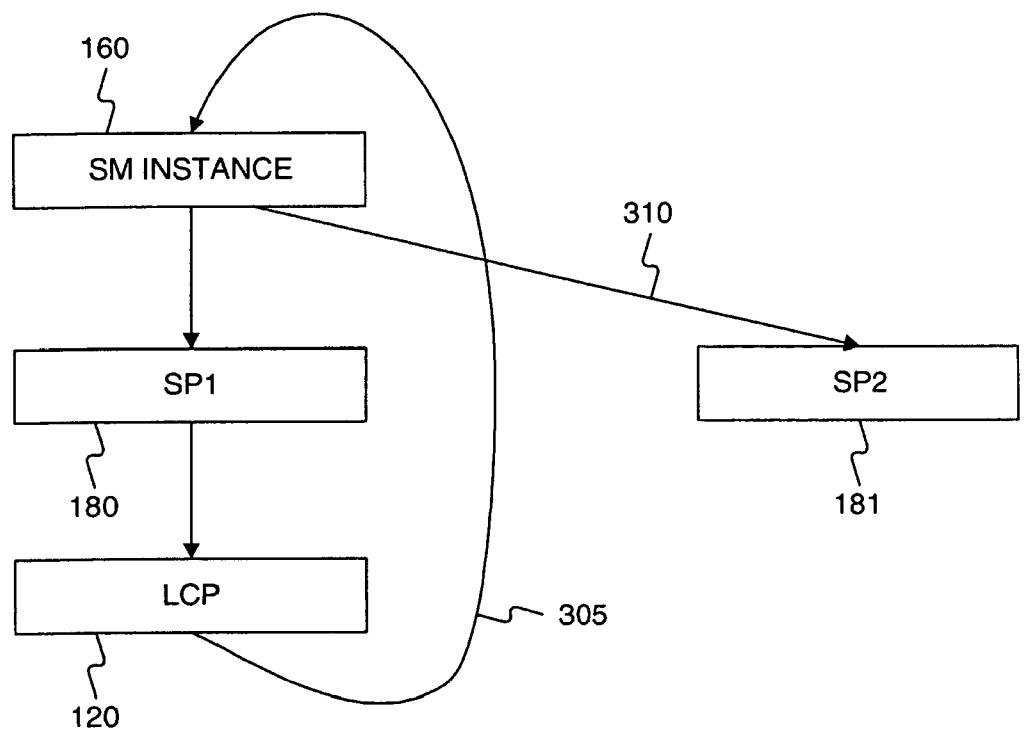
FIG. 3 illustrates a block diagram of a local client proxy making a call consistent with certain aspects related to the present invention.

FIG. 3 depicts service manager 160, service providers 180, 181, and local client proxy 120. Local client proxy 120 uses the change handler from the service manager. Local client proxy 120 may not create change handlers. Instead, local client proxy 120 uses the change handler that exists on service manager 160. Next, with the change handler, local client proxy 120 calls 305 the API of service manager 160, which in turn calls 310 the API of service provider 181. The change handler of local client proxy 120 tracks changes, namely any changes that occur to service provider 181 and its corresponding business objects. For example, a change can occur because of changes caused at user interface 125, such as a button click, field change, query, and the like. Moreover, a change can occur when service provider 180 writes to service provider 181. When the call to service provider 181 is complete, the stack implementing the change handler can be used to read all corresponding change notification messages. The change notifications may be sent to generic client proxy 140. Moreover, the service provider (implemented by local client proxy 120) may implement any changes that a subsequent service provider sends to the change handler.

Figure 4:
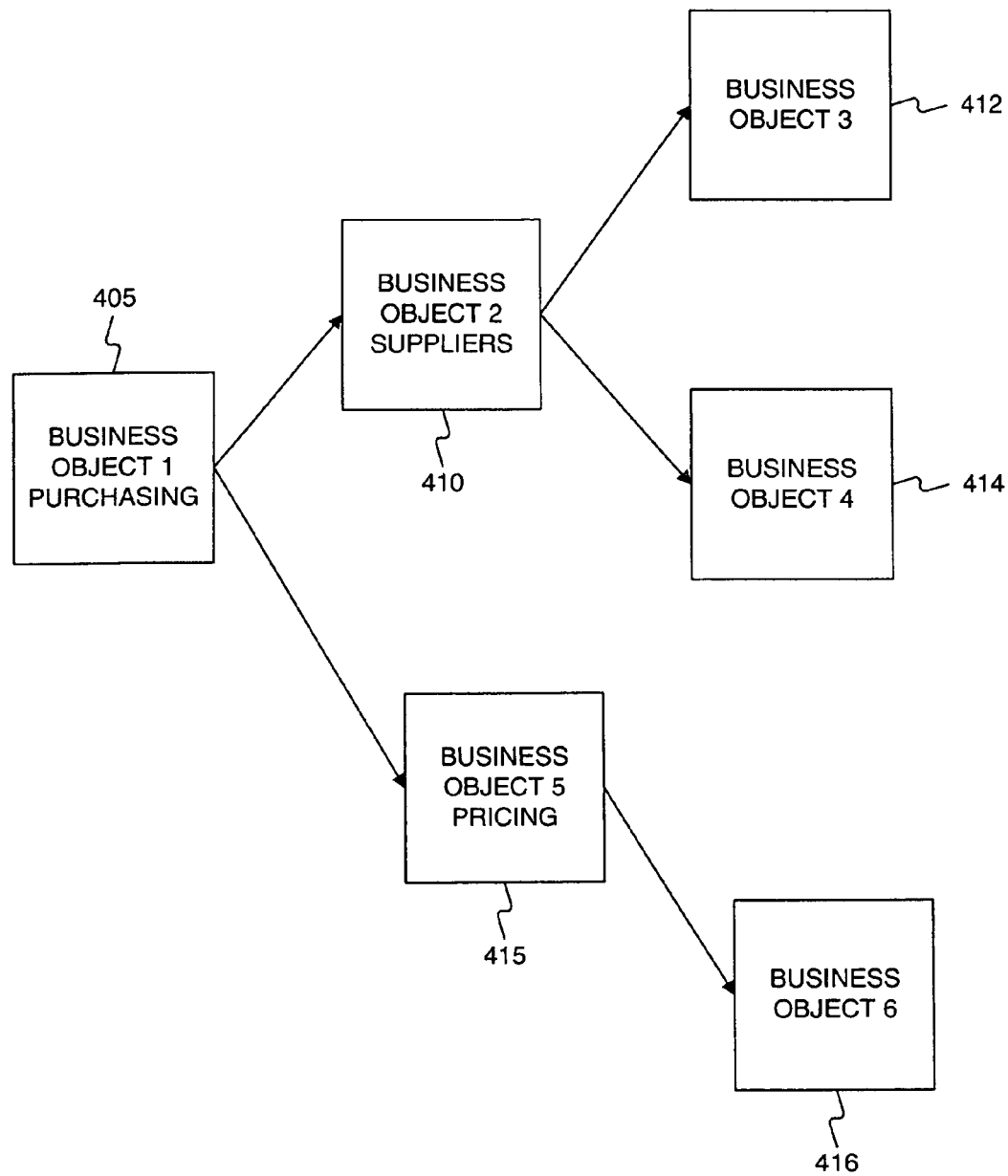
FIG. 4 illustrates a block diagram business objects that are registered at a service provider consistent with certain aspects related to the present invention.

FIG. 4 shows business objects 405-416 that may be registered at a service provider, such as service provider 180. As shown in FIG. 4, a service provider may register business objects 405-426 used by the service provider. The registration can provide a hierarchal list of business objects 405-426, although a simple list can be used instead. FIG. 4 is only illustrative since any approach to registering business objects may be used.

Figure 5:
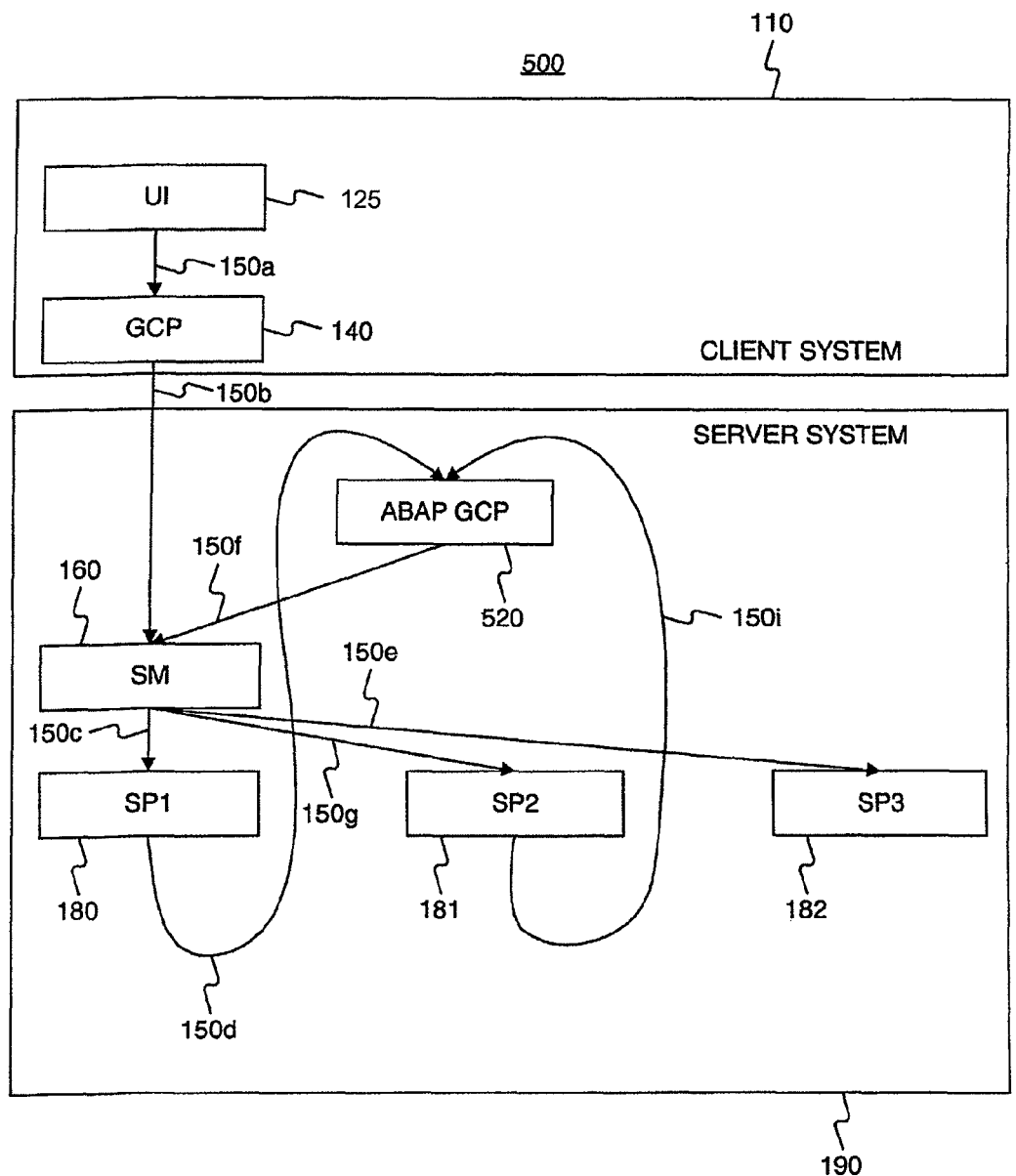
FIG. 5 illustrates another block diagram of an exemplary system environment using a generic client proxy consistent with certain aspects related to the present invention.

FIG. 5 illustrates a block diagram of an exemplary system environment 500 that is similar to FIG. 1 in many respects, but FIG. 5 uses a generic client proxy 520 at server system 190 instead of local client proxy 120. Generic client proxy 520 is similar to generic client proxy 140, but is implemented locally at server system 190. Generic client proxy 520 may also include the full functionality of generic client proxy 140. When service provider 180 calls generic client proxy 520 to call service provider 181, generic client proxy 520 may instantiate a new service manager to make the call to service provider 181. The instantiation of a new service manager is unlike the local client proxy 120 case, which uses the same instance of service manager 150 to call service providers 180-182. Generic client proxy 520 may be implemented in the Advanced Business Application Programming (ABAP) programming language (commercially available from SAP Walldorf, Germany), although other programming languages may be used.

Referring again to FIG. 1, operation of local client proxy 120 may involve the state of the service providers 180-182 to change. When reading or writing to service provider 180 and its corresponding business object, the business object must be place in a "clean" state. A clean state may be obtained by performing a flush function, which executes any previously pending actions (e.g., a write, a create, an update, a delete, and so forth) at the service provider and the corresponding business object. Once the flushing function is completed, local client proxy 120 can read or write to the service provider and the corresponding business object.

Figure 6:
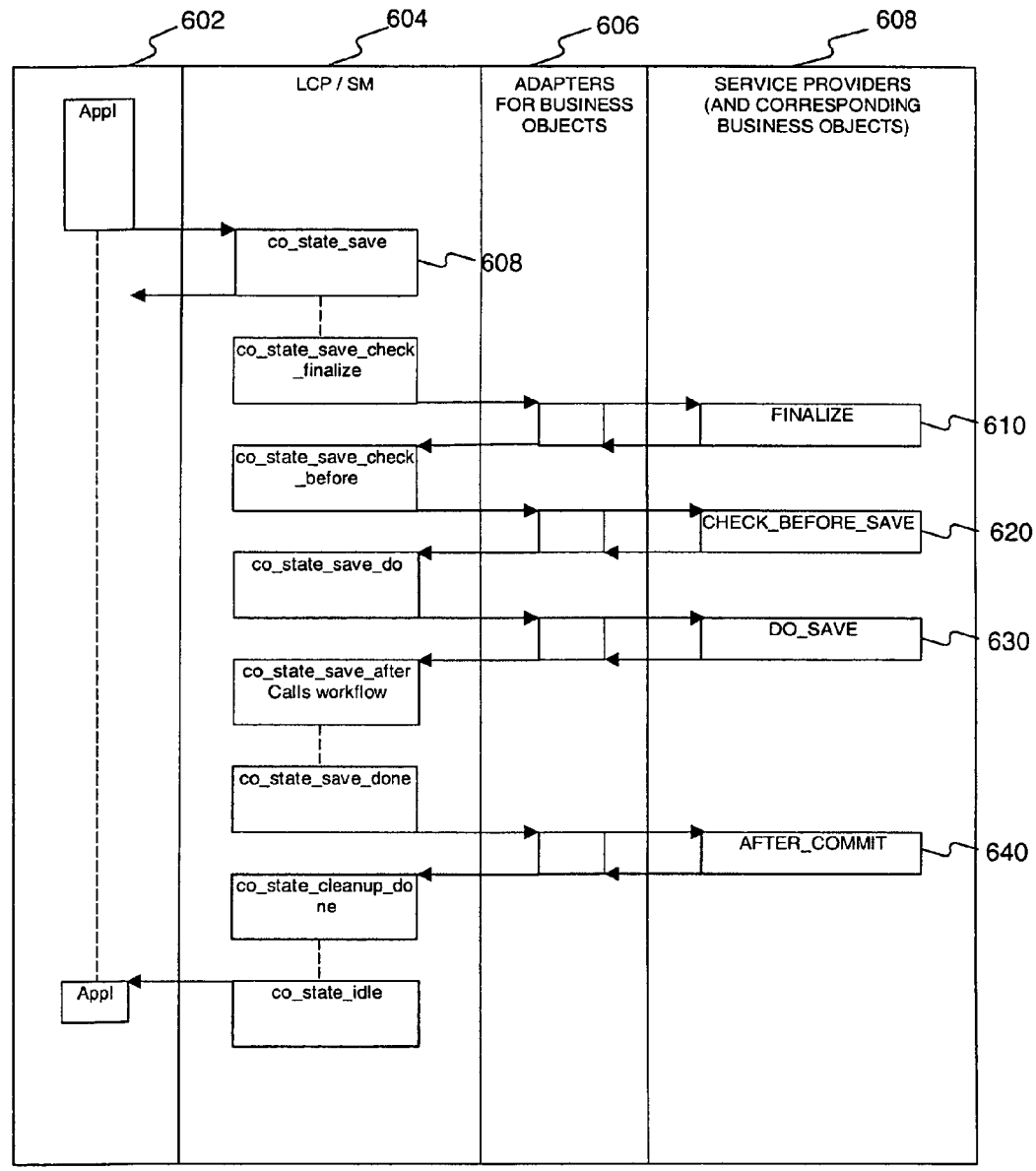
FIG. 6 illustrates a flow diagram of the steps associated with a "save" by local client proxy 120 or generic client proxy 140 consistent with certain aspects related to the present invention.

FIG. 6 depicts a "save" 630 by local client proxy 120 to a service provider and its business object. The save is preceded by pre-save operations performed to place the business object in an accurate state before performing the save 630. To that end, when a save is requested at local client proxy 120, a finalize state 610 is established at service provider 180 and its corresponding business object. In finalize state 610, local client proxy 120 can read and write to the business object at service provider 181, but the business object must be in a "checked" mode. The checked mode means that the business object has had a "before save" completed (e.g., any previously pending saves to service provider 180 have been completed). Next, the check before save state 620 is established. In the check before save state 620, service provider 180 and its corresponding business object can only be read from, and any before saves should have already been completed (e.g., service provider 180 and its corresponding business object should be in checked mode). In the do save state 630, the buffer of the enterprise service provider 180 is saved into the database. In the after commit state 640, local client proxy 120 or service manager 160 can perform some clean up operations, such as deleting internal buffers. If there is a failure after a finalize 610, check before save 620, or do save 630, a default state (not shown) may be implemented to temporally forbid reading or writing to a business object until after the failure is resolved.

FIG. 6 also shows that an adapter layer 606 is used between service manager 160 and service providers 180-182 and their corresponding business objects. The adapter layer is an API that can be used to adapt a call from service manager 160 to the service providers, so that the call is compatible with the service provider API.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method comprising:
   receiving, at a server system from a second proxy at a client system, a first call for a first service provider of a plurality of service providers, the server system comprising one or more first processors and the plurality of service providers;
   creating, at the server system after receipt of the first call, an instance of a service manager that comprises a message handler for handling messages to and from the instance of the service manager, a controller for controlling dynamic properties of the instance of the service manager, and a change handler;
   instantiating, by the instance of the service manager in response to the first call, the first service provider and a first proxy at the server system;
   receiving, at the first proxy, a second call from the first service provider that calls a subsequent service provider of the plurality of service providers; and calling, through the first proxy rather than through the second proxy at the client system, the subsequent service provider;

employing, by the first proxy, the change handler to track changes occurring to the subsequent service provider and one or more business objects that correspond to the subsequent service provider; and sending change notifications for the tracked changes to the second proxy upon completion of the second call to that second proxy.

2. The method of claim 1, wherein the first call is received at an interface of the service manager.

3. The method of claim 1, wherein the first proxy comprises a generic client proxy that instantiates a new instance manager to make the call to the subsequent service provider.

4. The method of claim 1, wherein the first proxy is a local client proxy that calls the subsequent service provider through the instance of the service manager without creating a new instance of the service manager.

5. The method of claim 1, wherein the subsequent service provider is the first service provider or a second service provider of the plurality of service providers.

6. The method of claim 1, wherein of the first proxy comprises changing a state of one of the plurality of service providers, the method further comprising:

executing a previously pending action at the one of the plurality of service providers or at a business object corresponding to the one of the plurality of service providers; and reading or writing by the first proxy to the one of the plurality of service providers or the business object after the previously pending action has been executed.

7. The method of claim 1, further comprising:

requesting, at the first proxy, a save to the subsequent service provider and a business object corresponding to the subsequent service provider;

performing a pre-save operation to place the business object in an accurate state, the pre-save operation comprising checking whether all previously pending saves to the subsequent service provider has been completed; and saving the tracked changes to the subsequent service provider and the business object.

8. A system comprising:

a processor; and a memory in communication with the processor, wherein the processor and the memory, comprise a plurality of service providers and are configured to perform operations comprising:

receiving, at the one or more processors from a second proxy at a client system, a first call for a first service provider of the plurality of service providers;

creating, after receipt of the first call, an instance of a service manager that comprises a message handler for handling messages to and from the instance of the service manager, a change handler for handling changes affecting one or more of the plurality of service providers, a controller for controlling dynamic properties of the instance of the service manager, and a change handler;

instantiating, by the instance of the service manager in response to the first call, the first service provider and a first proxy at the server system;

receiving, at the first proxy, a second call from the first service provider that calls a subsequent service provider of the plurality of service providers;

calling, through the first proxy rather than through the second proxy at the client system, the subsequent service provider;

employing, by the first proxy, the change handler to track changes occurring to the subsequent service provider and one or more business objects that correspond to the subsequent service provider; and sending change notifications for the tracked changes to the second proxy upon completion of the second call so that second proxy.

9. The system of claim 8, wherein the first call is received at an interface of the service manager.

10. The system of claim 8, wherein the first proxy comprises a generic client proxy that instantiates a new instance of the service manager to make the call to the subsequent service provider.

11. The system of claim 8, wherein the first proxy is a local client proxy that calls the subsequent service provider through the instance of the service manager without creating a new instance of the service manager.

12. A non-transmission computer-readable storage medium containing instructions to configure a processor to perform a method for calling a service provider using a service manager and a local client proxy, the method comprising:

receiving, at a server system from a second proxy at a client system, a first call for a first service provider of a plurality of service providers, the server system comprising one or more first processors and the plurality of service providers;

creating, at the server system after receipt of the first call, an instance of a service manager that comprises a message handler for handling messages to and from the instance of the service manager, a controller for controlling dynamic properties of the instance of the service manager, and a change handler;

instantiating, by the instance of the service manager in response to the first call, the first service provider and a first proxy at the server system;

receiving, at the first proxy, a second call from the first service provider that calls a subsequent service provider of the plurality of service providers;

calling, through the first proxy rather than through the second proxy at the client system, the subsequent service provider;

employing, by the first proxy, the change handler to track changes occurring to the subsequent service provider and one or more business objects that correspond to the subsequent service provider; and sending change notifications for the tracked changes to the second proxy upon completion of the second call to that second proxy.

13. The non-transmission computer-readable storage medium of claim 12, wherein the first call is received at an interface of the service manager.

14. The non-transmission computer-readable storage medium of claim 12, wherein the first proxy comprises a generic client proxy that instantiates a new instance of the service manager to make the call to the subsequent service provider.

15. The non-transmission computer-readable storage medium of claim 12, wherein the first proxy is a local client proxy that calls the subsequent service provider through the instance of the service manager without creating a new instance of the service manager.

* * * * *